Figure 1:
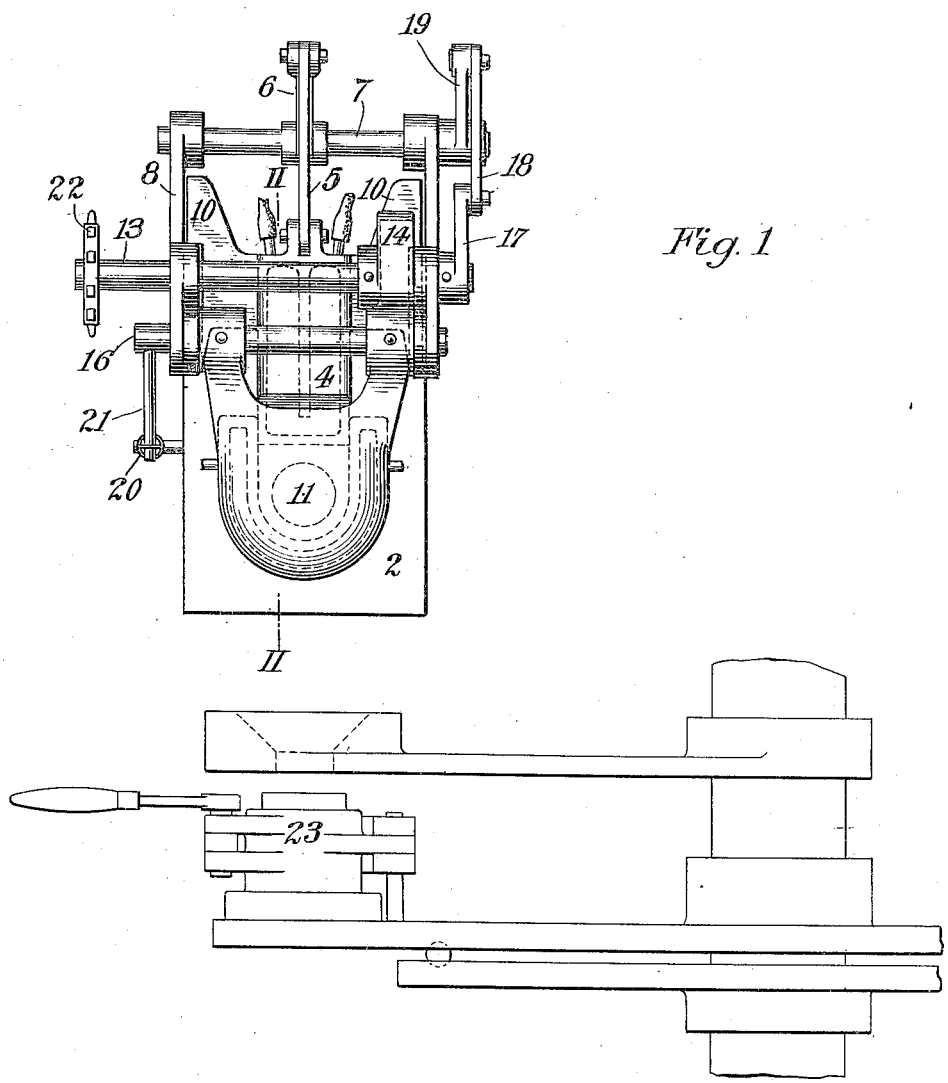

T. STENHOUSE.
MECHANISM FOR DELIVERING GLASS FROM A FURNACE OR THE LIKE.
APPLICATION FILED DEC. 19, 1914.

1,236,496.

Patented Aug. 14, 1917.
2 SHEETS—SHEET 1.

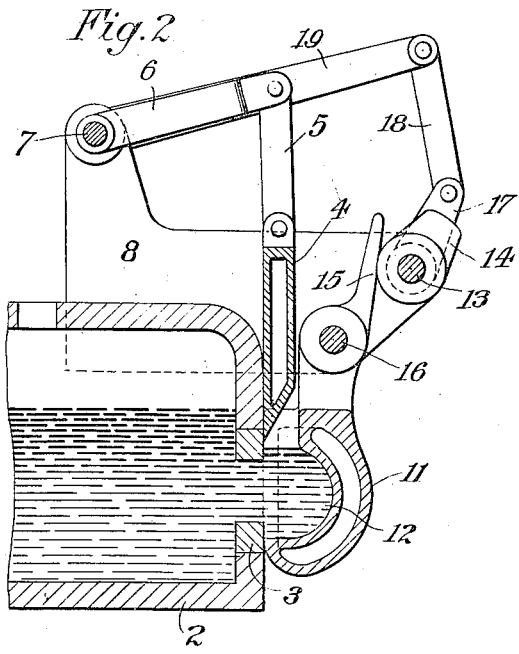
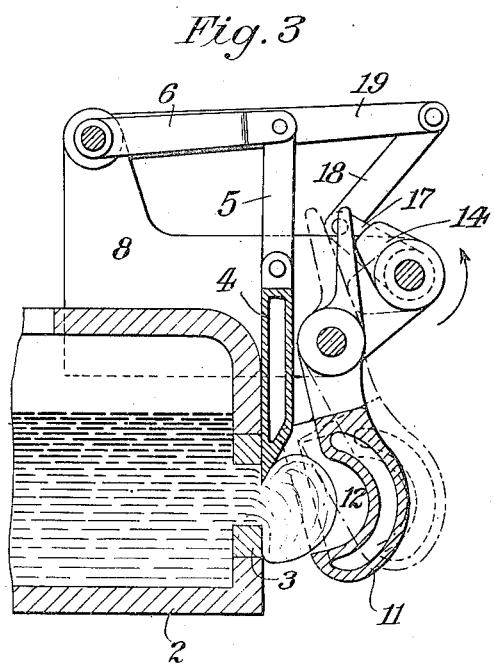
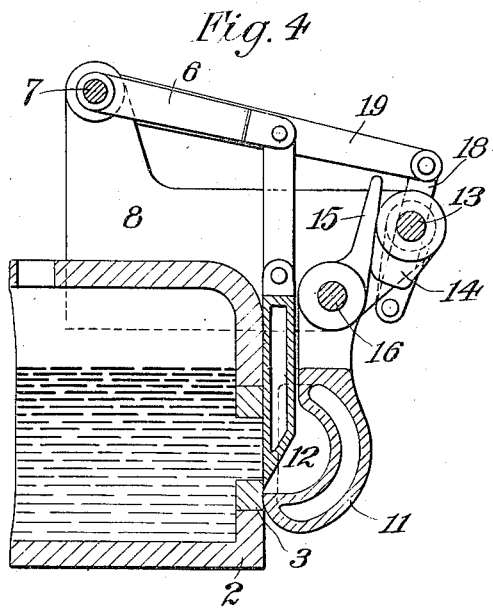
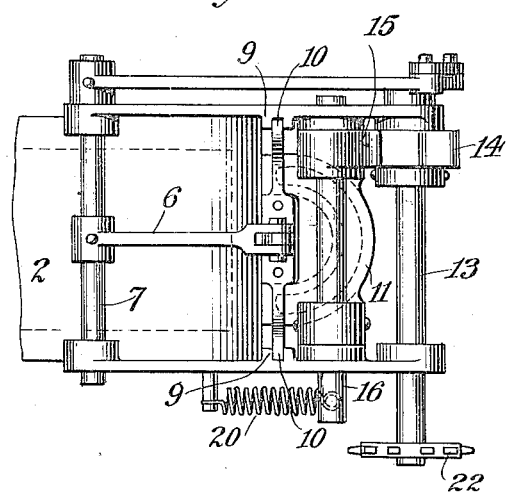

UNITED STATES PATENT OFFICE.

THOMAS STENHOUSE, OF WASHINGTON, PENNSYLVANIA, ASSIGNOR TO HAZEL-ATLAS GLASS COMPANY, OF WHEELING, WEST VIRGINIA, A CORPORATION OF WEST VIRGINIA.

MECHANISM FOR DELIVERING GLASS FROM A FURNACE OR THE LIKE.

1,236,496.  Specification of Letters Patent.  Patented Aug. 14, 1917.

Application filed December 19, 1914. Serial No. 878,022.

*To all whom it may concern:*

Be it known that I, THOMAS STENHOUSE, a citizen of the United States, residing at Washington, Washington county, Pennsylvania, have invented new and useful Improvements in Mechanism for Delivering Glass from Furnaces or the like, of which the following is a specification, reference being had to the accompanying drawings, in which—

Figure 1 is an elevation of my improved apparatus; Fig. 2 is a section, partly in elevation, on lines II—II of Fig. 1; Fig. 3 is a section similar to Fig. 2, but with the container in open position and with the cut-off knife operative to sever the glass, Fig. 4 is a section similar to Figs. 2 and 3, but with the cut-off knife closing the aperture in the furnace mouth and with the container in closed position, and Fig. 5 is a plan thereof.

My invention relates to the automatic delivery of glass from a furnace, tank, or the like, and is designed to deliver the glass in the molds or other receptacles in such quantities as may be desired. My improved mechanism consists of a container for the glass positioned at the aperture at the delivery spout, which operates in connection with a cut-off mechanism, so that I am enabled to separate charges of glass of a desired weight, and of a uniform character, and to deliver them into suitable receptacles. My invention also consists in the construction and coöperation of the parts which I shall hereinafter describe and claim.

Referring to the drawings, 2 indicates the furnace spout, through which the glass is delivered. The spout 2 has an apertured clay bushing 3, through which the glass flows and which also constitutes a cutting edge for the cut-off knife 4, which reciprocates across the face of the bushing 3. The knife is supported on a link 5, which is attached to an arm of a lever 6, secured to a shaft rod 7, which is mounted in bearings in the frame 8. The frame 8 is provided with vertically-extending guides 9, for reception of the flange 10 of the cut-off knife 4, and which serve to guide the knife and maintain it in proper relation to the face of the bushing 3. Pivoted to the frame 8 is the container 11, which, in closed position, as is shown in Figs. 2 and 4, has a chamber 12, which surrounds the aperture in the bushing 3 and receives the glass as it flows therefrom. Mounted on the driving shaft 13, which is journaled in the frame 8, is a cam 14, intended to engage an upward extension 15 of the container 11 and to rotate it upon its shaft 16 which is also journaled in the frame 8. The shaft 13 also drives the shaft rod 7, through a crank arm 17, which is connected by a link 18 to a crank arm 19, mounted on the rod 7. The container 11 is normally held in closed position, *i. e.*, against the face of the bushing 3, by means of a spring 20, which is attached to an arm 21 on the container shaft 16. The mechanism is preferably actuated through power supplied to the sprocket wheel 22, positioned on the shaft 13. The knife 4 and the container 11 are preferably water cooled, as shown.

My device is operated as follows: When the glass has reached the necessary molten state and the machine is in operation, the container 11 will normally occupy the position shown in Fig. 2, since the spring 20 tends to hold the container 11 against the face of the bushing 3. The rotation of the driving shaft 13 brings the cam 14 into contact with the extension 15 on the container 11, and rotates the container 11 outwardly about its pivot 16, by a quick stroke, permitting the glass which has accumulated in the chamber 12 within the container, to drop into the mold 23 lying immediately below. At the same time the driving shaft 13 also actuates the crank arm 17, and through it the rod 7, which in turn actuates the cut-off knife 4, causing it to descend and cut off the mass of molten glass which has collected in the container 11 from the glass still in the furnace spout, and the cut-off mass will thus be free to fall into the mold below. The cut-off knife 4 continues to descend until it has closed the aperture in the bushing 3, and as soon as the cam 14 has rotated out of contact with the extension 15 on the container 11, the container 11 will be brought back by the spring 20 into closed position. Further rotation of the shaft 13 will lift the cut-off knife 4 and will permit the glass to again flow into and fill up the chamber 12 in the container 11, and when the cam 14 has again rotated, it will come into contact with the extension 15 on the container, and the operation will be repeated.

I have found that in the use of the apparatus which I have just described, the glass flows into the container in a homogeneous plastic mass, and this plastic mass, when severed by the cut-off knife, drops as a whole into the mold or receptacle which has been placed beneath it, and that the resulting articles are of uniform character and free from air bubbles.

The good quality of the glass articles obtained by the use of mechanism embodying my invention I believe is due to the fact that the glass as it is dropped into the mold in a relatively large mass does not become unduly cooled or affected by external conditions prior to its treatment in the mold.

Various modifications may be made in the construction and coöperation of the various parts which I have described and shown herein, without departing from my invention.

What I claim is:

1. In apparatus for delivering molten glass from a furnace or the like, a single container located at the delivery spout adapted to be oscillated and to assume a supporting position and a non-supporting position for the glass, said container being adapted when in supporting position to inclose the mouth of the spout, a mold positioned directly under the discharge portion of the spout and in a plane taken through the vertical axes of the container and the spout, and a cut-off knife reciprocating between the container and the spout and adapted to sever the glass in the container from the glass in the spout, the container being arranged to permit its charge to drop directly from the spout into the mold.

2. In apparatus for delivering molten glass from a furnace or the like, a furnace spout having an aperture therein, a container mounted above the aperture in the furnace spout and adapted in one position to support the glass in the same plane as the aperture, a mold positioned directly below the end of the spout and in vertical alinement with the container, a cut-off mechanism coöperating with the container and adapted to sever the glass in the container from the glass in the furnace as the container moves to a non-supporting position, the container being adapted to drop its charge direct from the spout into the mold, and means for actuating the container and the cut-off mechanism.

3. In apparatus for delivering molten glass from a furnace or the like, a delivery spout having an aperture therein, a container mounted on a pivot arranged transversely of the spout for movement in the plane of said spout toward and away from said spout, said container having a chamber therein adapted to restrict the flow of glass to a predetermined quantity and shape, a mold positioned directly below the discharge portion of the spout and in the same vertical plane as the aperture in the spout and the container, a cut-off knife adapted to reciprocate across the aperture, and means for moving the container from supporting to non-supporting position and for simultaneously reciprocating the knife to cut the glass in the container from the glass in the spout to permit the charge of glass to fall direct from the spout into the mold.

4. In apparatus for delivering molten glass from a furnace or the like, a delivery spout having an aperture therein, a container comprising, with the face of the spout, a chamber for a predetermined charge of glass, a mold positioned directly below the discharge end of the spout and in the plane of the vertical axes of the spout and of the container, said container being arranged for movement in the plane of the vertical axis of the spout and assuming a supporting and a non-supporting position for the glass, said container, when in supporting position, having its chamber in registry with the aperture in the spout and thereby restricting the flow of glass to the amount the chamber contains, and a glass-severing mechanism for separating the glass in the chamber from the glass in the spout, said container, when assuming non-supporting position, permitting the glass contained in the chamber to fall directly and unsupported from the spout into the mold.

THOMAS STENHOUSE.

Witnesses:
GRANT E. HESS,
JAMES A. MAGILL.